US012243667B2

(12) United States Patent
Tokiwa et al.

(10) Patent No.: US 12,243,667 B2
(45) Date of Patent: Mar. 4, 2025

(54) MANUFACTURING METHOD OF RESISTOR AND RESISTOR

(71) Applicant: KOA Corporation, Nagano (JP)

(72) Inventors: Yohei Tokiwa, Nagano (JP); Kohji Eto, Nagano (JP); Tomofumi Noguchi, Nagano (JP); Reina Kaneko, Nagano (JP)

(73) Assignee: KOA Corporation, Nagano (JP)

(*) Notice: Subject to any disclaimer, the term of this patent is extended or adjusted under 35 U.S.C. 154(b) by 323 days.

(21) Appl. No.: 17/759,487

(22) PCT Filed: Dec. 25, 2020

(86) PCT No.: PCT/JP2020/048953

§ 371 (c)(1), (2) Date: Jul. 26, 2022

(87) PCT Pub. No.: WO2021/153138

PCT Pub. Date: Aug. 5, 2021

(65) Prior Publication Data

US 2023/0146171 A1 May 11, 2023

(30) Foreign Application Priority Data

Jan. 27, 2020 (JP) ................................. 2020-011192

(51) Int. Cl.
*H01C 1/14* (2006.01)
*H01C 17/00* (2006.01)

(52) U.S. Cl.
CPC ............ *H01C 1/14* (2013.01); *H01C 17/006* (2013.01)

(58) Field of Classification Search
CPC ................................ H01C 1/14; H01C 17/006
See application file for complete search history.

(56) References Cited

U.S. PATENT DOCUMENTS 9,076,576 B2 * 7/2015 Saito ...................... H01C 7/008
9,911,524 B2 * 3/2018 Tanaka ................. H01C 17/242
9,934,893 B2 * 4/2018 Murakami ............. H01C 17/22

FOREIGN PATENT DOCUMENTS

JP 2000-232007 A 8/2000
JP 2002-057009 A 2/2002
WO 2013076817 A1 5/2013

OTHER PUBLICATIONS

International Search Report, Application No. PCT/JP2020/048953, mailed Mar. 16, 2021. ISA/Japan Patent Office.

* cited by examiner

*Primary Examiner* — Kyung S Lee
(74) *Attorney, Agent, or Firm* — Honigman LLP

(57) ABSTRACT

A manufacturing method of a resistor contains: a step of forming a resistor base material by stacking an electrode material, a resistive material, and an electrode material in this order and by bonding the electrode material, the resistive material, and the electrode material by applying pressure in the stacked direction; a step of passing the resistor base material through a die, the die being formed with an opening portion having a dimension smaller than an outer dimension of the resistor base material; and a step of obtaining an individual resistor from the resistor base material passed through the die.

5 Claims, 11 Drawing Sheets

MANUFACTURING METHOD OF RESISTOR AND RESISTOR

CROSS-REFERENCE TO RELATED APPLICATIONS

This application is the U.S. national stage of PCT/JP2020/048953 filed on Dec. 25, 2020, which claims priority of Japanese Patent Application No. JP 2020-011192 filed on Jan. 27, 2020, the contents of which are incorporated herein.

TECHNICAL FIELD

The present disclosure relates to a manufacturing method of a resistor, as well as to the resistor.

BACKGROUND

As resistors to be mounted on a substrate board, a resistor having a low resistance and a current path that is suitable for a high current measurement has been proposed (see JP2002-57009A).

SUMMARY

In recent year, as electronic devices are highly functionalized, there are increasing demands for a high-density mounting for circuit boards on which electronic components are to be mounted. However, in the resistor described in JP2002-57009A, it is difficult to further reduce its size while maintaining the dimensional accuracy, and so, there has been still a possibility for an improvement.

The present disclosure has been conceived in light of the above-described problem, and an object thereof is to reduce size of a resistor while ensuring a dimensional accuracy.

A manufacturing method of a resistor as an aspect of the present disclosure is a manufacturing method including: a step of forming a resistor base material by stacking an electrode material, a resistive material, and an electrode material in this order and by bonding the electrode material, the resistive material, and the electrode material by applying pressure in the stacked direction; a step of passing the resistor base material through a die, the die being formed with an opening portion having a dimension smaller than an outer dimension of the resistor base material; and a step of obtaining an individual resistor from the resistor base material passed through the die.

In addition, the resistor as an aspect of the present disclosure is the resistor to be mounted on a circuit board, and the resistor is provided with the resistive material, a first electrode material that is bonded to a first end surface of the resistive material, and a second electrode material that is bonded to a second end surface of the resistive material, wherein a surface of the resistor is formed with stripe-patterned grooves and ridges that extend in the direction orthogonal to the bonding direction in which the first electrode material, the resistive material, and the second electrode material are arranged.

According to these aspects, it is possible to reduce the size of the resistor while ensuring the dimensional accuracy.

DETAILED DESCRIPTION OF PREFERRED EMBODIMENTS

Explanation of Resistor

First Embodiment

Figure 1:
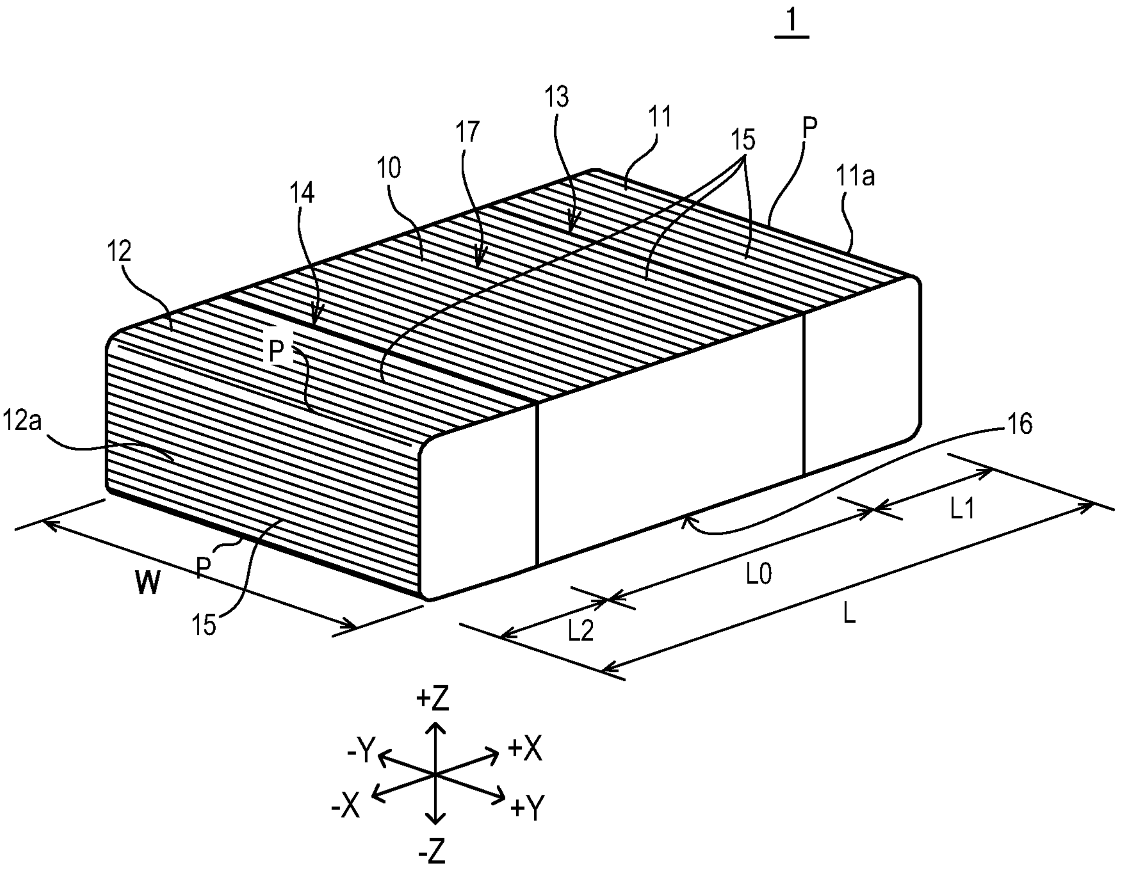
FIG. 1 is a perspective view for explaining a resistor according to a first embodiment of the present disclosure.

A resistor 1 of a first embodiment according to the present disclosure will be described in detail with reference to FIG. 1. FIG. 1 is a perspective view for explaining a structure of the resistor 1 according to the present embodiment.

The resistor 1 is provided with a resistive material 10, a first electrode material 11, and a second electrode material 12 and is formed by bonding the first electrode material 11, the resistive material 10, and the second electrode material 12 in this order. The resistor 1 is mounted on a circuit board, etc., which is not shown in FIG. 1. For example, the resistor 1 is arranged on a pair of electrodes that are formed on a land pattern of the circuit board. In the present embodiment, the resistor 1 is used as a current sensing resistor (a shunt resistor).

In the present embodiment, the direction in which the first electrode material 11 and the second electrode material 12 are arranged (the longitudinal direction of the resistor 1) is referred to as the X direction (the direction towards the first electrode material 11 is referred to as the +X direction, and the direction towards the second electrode material 12 is referred to as the −X direction). The width direction of the resistor 1 is referred to as the Y direction (the front side with respect to the plane of FIG. 1 is referred to as the +Y direction, and the back side with respect to the plane of FIG. 1 is referred to as the −Y direction), and the thickness direction of the resistor 1 is referred to as the Z direction. The X direction, the Y direction, and the Z direction are orthogonal with each other.

For the resistive material 10, it is possible to use materials having low to high resistances according to the application. In the present embodiment, from the view point of sensing a large current at a high accuracy, it is preferable that the resistive material 10 be formed of a resistance body material having a low specific resistance and a small temperature coefficient of resistance (TCR). As examples, a copper-manganese-nickel alloy, a copper-manganese-tin alloy, a nickel-chromium alloy, a copper-nickel alloy, and so forth can be used.

In the present embodiment, although the resistive material 10 is formed to have a square shape from the view point of achieving a high-density mounting, the shape of the resistive material 10 may be a trapezoid shape.

The first electrode material 11 and the second electrode material 12 are preferably be formed of an electrically conductive material having a good electrical conductivity and thermal conductivity from the view point of ensuring a stable sensing accuracy. As one example, copper, a copper alloy, and so forth may be used as the first electrode material 11 and the second electrode material 12. An oxygen-free copper (C1020) may preferably be used as the copper. The same material can be used for the first electrode material 11 and the second electrode material 12.

The first electrode material 11 has an end surface having substantially the same shape as a first end surface of the resistive material 10, and the first electrode material 11 is bonded to the first end surface of the resistive material 10 at this end surface. In addition, the second electrode material 12 has an end surface having substantially the same shape as a second end surface of the resistive material 10 that is on the opposite of the first end surface, and the second electrode material 12 is bonded to the second end surface of the resistive material 10 at this end surface.

In the present embodiment, a bonded portion 13 between the resistive material 10 and the first electrode material 11 and a bonded portion 14 between the resistive material 10 and the second electrode material 12 are both mutually bonded by a cladding (a solid phase bonding). In other words, bonded surfaces at the bonded portions 13 and 14 are respectively diffusion bonded surfaces in which metal atoms from both of the resistive material 10 and the respective electrode materials 11 and 12 are diffused to each other.

At the bonded portion 13 between the resistive material 10 and the first electrode material 11, a boundary between the resistive material 10 and the first electrode material 11 has no step and is flat. In other words, the resistive material 10 and the first electrode material 11 form a smooth continuous surface. Similarly, also at the bonded portion 14 between the resistive material 10 and the second electrode material 12, a boundary between the resistive material 10 and the second electrode material 12 has no step and is flat, and so, the resistive material 10 and the second electrode material 12 form a smooth continuous surface. In other words, the surfaces of the bonded portions 13 and 14 are formed so as to be flat over the entire circumference of the resistor 1 (the state in which the step is not formed).

From the view point of reducing the resistance value while ensuring the TCR (the temperature coefficient of resistance [ppm/° C.]), the ratio of a length L0 of the resistive material 10, the length L1 of the first electrode material 11, and a length L2 of the second electrode material 12 in the length direction of the resistive material 10 can be set arbitrarily, and as one example, the ratio can be set so as to be L1:L0:L2=1:2:1.

Furthermore, from the view point of reducing the resistance value, the ratio of the length L0 of the resistive material 10 relative to a length L of the resistor 1 (=L1+L0+L2) can be equal to or less than 50%.

In the present embodiment, the resistor 1 has, on its surface, stripe-patterned grooves and ridges 15. In the present embodiment, the stripe-patterned grooves and ridges 15 are formed on a mounting surface 16 of the resistor 1 for the circuit board and on an opposite surface 17 on the opposite side of the mounting surface 16. In addition, the stripe-patterned grooves and ridges 15 are formed so as to extend over the width direction Y. The mounting surface 16 of the resistor 1 means an entire surface of the resistor 1 facing the circuit board.

In addition, the stripe-patterned grooves and ridges 15 are respectively formed, so as to extend over the width direction Y, on an opposite surface 11*a* on the opposite side relative to the bonded surface between the first electrode material 11 and the resistive material 10 and on an opposite surface 12*a* on the opposite side relative to the bonded surface between the second electrode material 12 and the resistive material 10.

The surface roughness caused by the groove portions and the ridge portions of the stripe-patterned grooves and ridges 15 can be about from 0.2 to 0.3 μm in terms of arithmetic average roughness (Ra).

In the present embodiment, from the view point of adapting the resistor 1 to a high-density circuit board, the length L of the resistor 1 in the X direction can be equal to or shorter than 3.2 mm, and a length W of the resistor 1 in the Y direction can be equal to or shorter than 1.6 mm (product standard 3126 size or smaller). In addition, from the view point of achieving a handling property in a manufacturing method, which will be described below, for example, from the view point of preventing failure of a resistor base material forming a base of the resistor 1, etc., the length L of the resistor 1 in the X direction can be equal to or larger 1.0 mm, and the length W of the resistor 1 in the Y direction can be equal to or larger 0.5 mm (product standard 1005 size or larger).

In addition, in the present embodiment, from the view point of achieving the low resistance, the resistance value of the resistor 1 is adjusted so as to be equal to or lower than 2 mΩ. In the above, the low resistance is a concept including the resistance value that is lower than the resistance value of general resistors.

In the present embodiment, all edge side portions P of the resistor 1 extending in the Y direction have chamfered shapes. In the present embodiment, from the view point of suppressing an electromigration caused at the edge side portions P and improving a heat cycle resistance, it is preferred that a radius of curvature of each edge side portion P be set so as to be R=0.1 mm or less.

Actions and Effects

Next, actions and effects in the first embodiment will be described.

In the present embodiment, the bonded portion 13 between the resistive material 10 and the first electrode material 11 and the bonded portion 14 between the resistive material 10 and the second electrode material 12 are respectively formed with the diffusion bonded surfaces in which metal atoms from both of the resistive material 10 and the respective electrode materials 11 and 12 are diffused to each other. With such a configuration, the resistive material 10 and the first electrode material 11 are firmly bonded with each other, and the resistive material 10 and the second electrode material 12 are firmly bonded with each other, and therefore, a good electrical property can be obtained.

In the present embodiment, the resistor 1 is formed to have the square shape. When the resistive material 10 has the square shape, the first electrode material 11 and the second electrode material 12 are respectively formed to have substantially the same shapes as the end surfaces of the resistive material 10 and respectively bonded to the end surfaces of the resistive material 10, and a path of the current flowing from the first electrode material 11 and the second electrode material 12 through the resistive material 10 is formed linearly, and therefore, it is possible to stabilize the resistance value. In addition, in the resistor 1, because the resistive material 10 is bonded between the electrode materials 11 and 12, it is possible to adjust the resistance value while setting the volume of the resistive material 10 to the minimum required volume.

In addition, in the resistor 1, the electron beam welding, for example, is not used for the bonding between the resistive material 10 and the first electrode material 11 and the bonding between the resistive material 10 and the second electrode material 12, and therefore, the bonded portions 13 and 14 do not have beads (a welding mark having an irregular shape). Therefore, a bondability is not deteriorated even in a case in which wire bonding, etc. is performed on the surface of the resistor 1.

In addition, in the present embodiment, surfaces of the bonded portions 13 and 14 are each formed so as to be flat over the entire circumference of the resistor 1. Thus, at the time when the resistor 1 is to be mounted on the circuit board, etc., a capability to be sucked by a nozzle is increased for an operation of picking up the resistor 1 by suction by using the nozzle. Therefore, workability upon the mounting of the resistor 1 onto the circuit board is improved.

In the present embodiment, the stripe-patterned grooves and ridges 15 are formed so as to extend over the width direction Y on the mounting surface 16, the opposite surface 17 on the opposite side of the mounting surface 16, the opposite surface 11*a* on the opposite side of the surface of the first electrode material 11 bonded to the resistive material 10, and the opposite surface 12*a* on the opposite side of the surface of the second electrode material 12 bonded to the resistive material 10. Therefore, a good viewability for the attachment direction and the attachment orientation for the resistor 1 is ensured for an operator handling the resistor 1 during the mounting on the circuit board.

The stripe-patterned grooves and ridges 15 are smoother than irregularities formed by the beads, and the deterioration of the bondability during the wire bonding is not caused.

In the present embodiment, the length L of the resistor 1 in the bonding direction (the X direction) is formed so as to be equal to or shorter than 3.2 mm, and the length W thereof in in the Y direction is formed so as to be equal to or shorter than 1.6 mm. In addition, the lengths are adjusted such that the resistance value of the resistor 1 is equal to or lower than 2 mΩ.

At this size, with general resistors in which the resistive material is welded with the electrode material, from the view point of ensuring the dimensional accuracy, for example, it is required to consider influences of the beads caused by the electron beam welding. However, the resistor 1 according to the present embodiment is formed by bonding the resistive material 10 with the electrode materials 11 and 12 by the diffusion bonding, and so, it is possible to design the resistor 1 so as to have the small size and the low resistance as described above.

In the present embodiment, the edge side portions P of the resistor 1 each has the chamfered shape. In general resistors, the resistors tend to be damaged due to occurrence of a phenomenon called the electromigration that is caused as a current density is increased in a non-chamfered corner portion, or due to concentration of thermal stress to such a corner portion in a similar manner. In addition, because the electromigration has a non-negligible influence as the circuit size is decreased, there was a concern that the smaller the resistor is, the more pronounced the electromigration becomes.

In contrast, in the resistor 1 according to the present embodiment, because the edge side portions P are chamfered, deviation of the current density in the edge side portions P is reduced. Thus, it is possible to suppress occurrence of the electromigration. In addition, in a similar manner, because the concentration of the thermal stress can be reduced, it is possible to improve the heat cycle resistance.

Therefore, with the resistor 1, it is possible to reduce the size of the resistor while ensuring the dimensional accuracy. Thus, the resistor 1 can satisfy a demand in recent years for a high density to the circuit board, on which electronic components are to be mounted. In addition, because the beads are not formed on the bonded portions 13 and 14 between the electrode materials 11 and 12 and the resistive material 10, it is easy to ensure a distance between the electrodes, and so, it is easy to reduce the resistance value. Therefore, the resistor 1 can also satisfy a demand for a high electric power.

Second Embodiment

Figure 2:
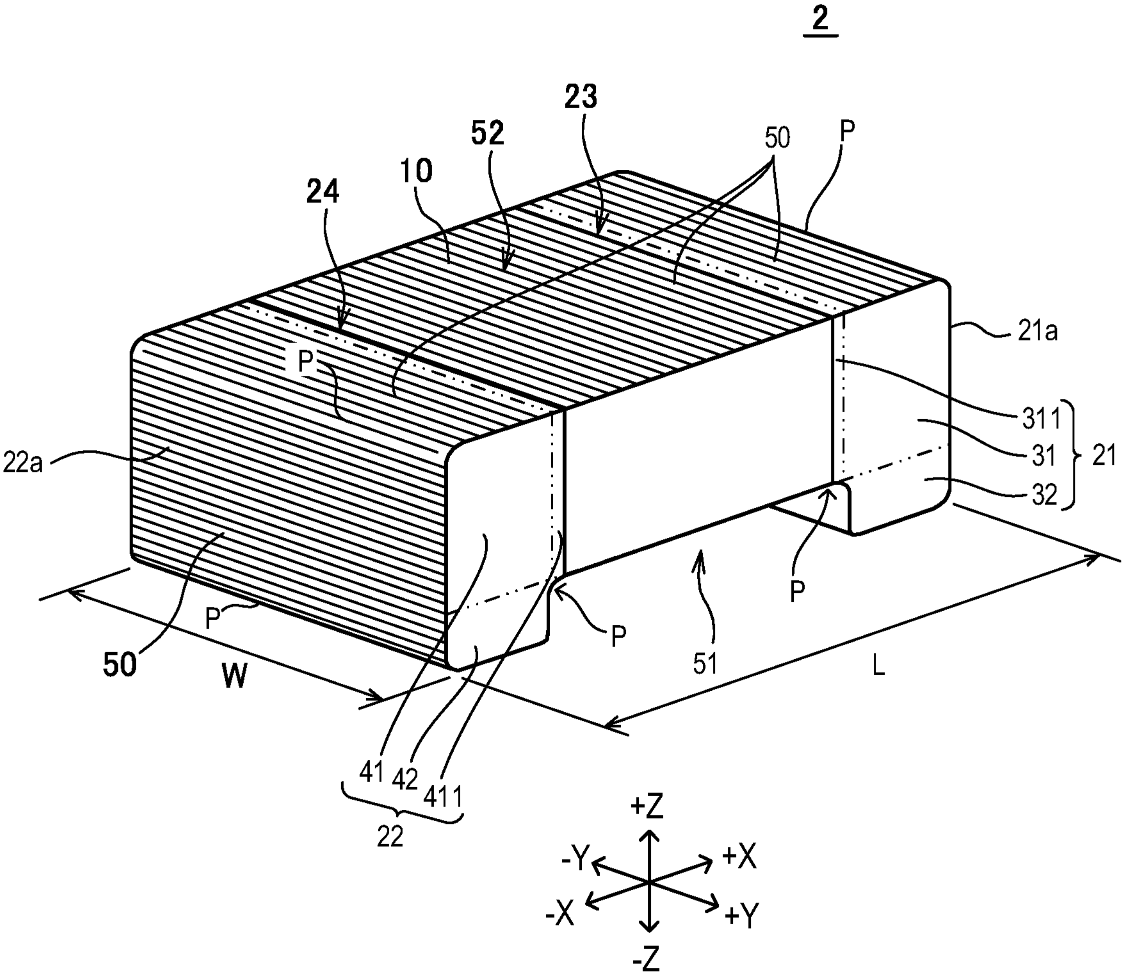
FIG. 2 is a perspective view for explaining the resistor according to a second embodiment of the present disclosure.
Figure 3:
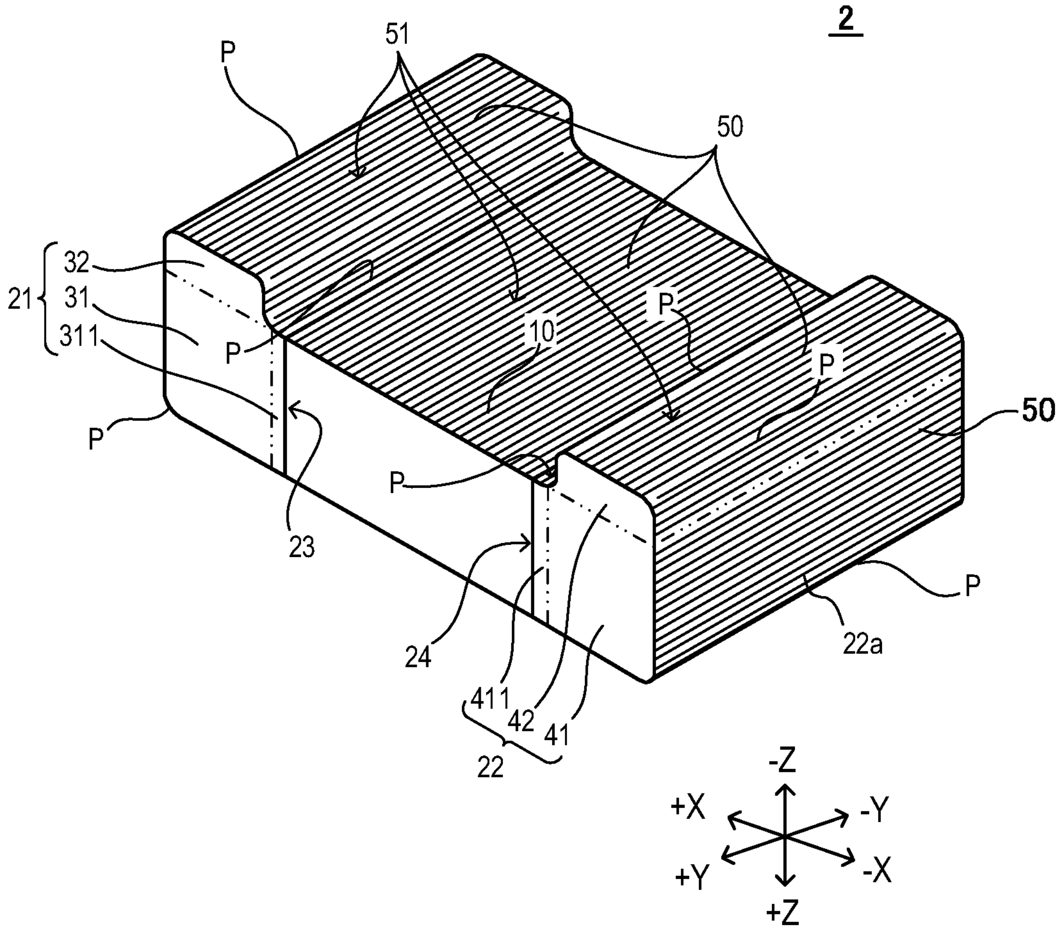
FIG. 3 is a perspective view of the resistor according to the second embodiment viewed from the side of a mounting surface for a circuit board.

FIG. 2 is a perspective view for explaining a resistor 2 according to a second embodiment of the present disclosure, and FIG. 3 is a perspective view of the resistor 2 according to the second embodiment viewed from the side of the mounting surface for the circuit board.

The resistor 2 is provided with the resistive material 10, a first electrode material 21, and a second electrode material 22. The resistive material 10, the first electrode material 21, and the second electrode material 22 are cladded with each other at bonded portions 23 and 24. The resistor 2 has the first electrode material 21 and the second electrode material 22 with different shapes from those in the resistor 1 according to the first embodiment.

The first electrode material 21 is provided with a main body portion 31 that is bonded to the resistive material 10 and an extended portion 32 that extends from the main body portion 31 in the −Z direction. In addition, the second electrode material 22 is provided with a main body portion 41 that is bonded to the resistive material 10 and an extended portion 42 that is formed integrally with the main body portion 41 and that extends from the main body portion 41 in the −Z direction.

The main body portion 31 is provided with a protruded portion 311 that protrudes towards the resistive material 10 and that has an end surface with substantially the same shape as the first end surface of the resistive material 10 (on the +X direction side). In the main body portion 31, the protruded portion 311 is bonded with the end surface of the resistive material 10 on the +X direction side so as to be abutted thereto. At the bonded portion 23 between the main body portion 31 and the resistive material 10, the boundary between the resistive material 10 and the protruded portion 311 of the main body portion 31 has no step and is flat, and so, the resistive material 10 and the main body portion 31 form a smooth continuous surface. In other words, a surface of the bonded portion 23 is formed so as to be flat over the entire circumference of the boundary between the resistive material 10 and the main body portion 31 (the state in which the step is not formed).

The main body portion 41 of the second electrode material 22 is also configured in a similar manner as the main body portion 31. In the main body portion 41, a protruded portion 411 is bonded to the end surface of the resistive material 10 on the −X direction side so as to be abutted thereto.

Because the extended portion 32 extending in the Z direction is formed on the main body portion 31, when the resistor 2 is to be mounted on the circuit board, it is possible to configure a leg portion, at which the extended portion 32 is bonded to the circuit board, by directing the extended portion 32 towards the circuit board. The extended portion 42 is also configured in a similar manner as the extended portion 32.

In addition, in the present embodiment, in the resistor 2, a mounting surface 51 of the resistor 2 for the circuit board, an opposite surface 52 on the opposite side of the mounting surface 51, an opposite surface 21*a* on the opposite side of the surface of the first electrode material 21 bonded to the resistive material 10, and an opposite surface 22*a* on the opposite side of the surface of the second electrode material 22 bonded to the resistive material 10 respectively have stripe-patterned grooves and ridges 50 extending over the Y direction that is orthogonal to the X direction. In the above, the mounting surface 51 means an entire surface facing the circuit board, and the mounting surface 51 includes not only the surfaces of the extended portions 32 and 42 on the circuit board side, but also the surface of the resistive material 10 on the circuit board side.

Actions and Effects

Next, actions and effects in the second embodiment will be described.

The bonded surfaces at the bonded portion 23 are respectively the diffusion bonded surfaces in which the metal atoms from the resistive material 10 and the electrode material 21 are diffused to each other. Therefore, even if the resistive material 10 and the first electrode material 21 are not welded by using the electron beam, they are firmly bonded with each other. In addition, the same applies to the resistive material 10 and the second electrode material 22. Thus, it is possible to obtain the good electrical property for the resistor 2.

In addition, with the resistor 2, the following effects are afforded in addition to the viewability, the bondability, the capability to be sucked by the nozzle, the suppression of the electromigration, and the heat cycle resistance, which have been described as the effects afforded with the resistor 1 shown in FIG. 1.

In other words, because the first electrode material 21 and the second electrode material 22 respectively have the extended portions 32 and 42, when the resistor 2 is to be mounted on the circuit board, the extended portions 32 and 42 can respectively configure the leg portions. Thus, when the resistor 2 is to be mounted on the circuit board, there is no need to provide an insulation configuration between the circuit board and the resistive material 10 in order to avoid contact between the resistive material 10 and the circuit board.

Modification

Next, a modification of the second embodiment will be described.

First Modification

Figure 4:
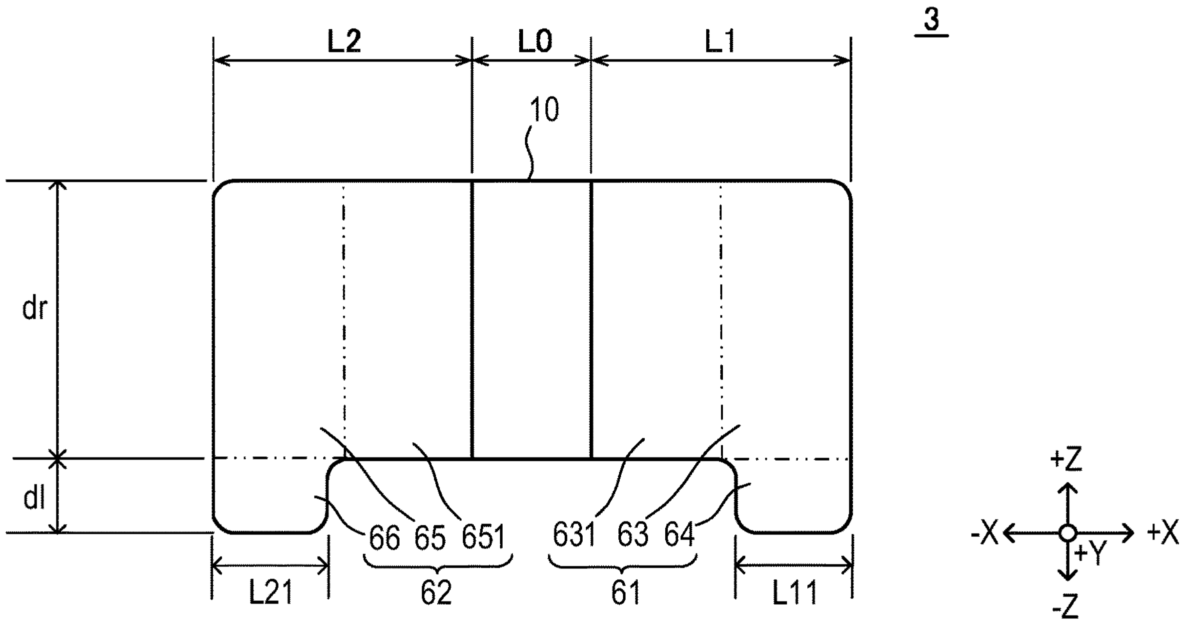
FIG. 4 is a side view for explaining the resistor according to a first modification of the present disclosure.

FIG. 4 is a side view for explaining a resistor 3 according to a first modification of the present embodiment.

The resistor 3 is provided with a first electrode material 61 and a second electrode material 62 that are respectively bonded to the resistive material 10. The first electrode material 61 is provided with a main body portion 63 that is bonded to the resistive material 10 and an extended portion 64 that is formed integrally with the main body portion 63 and that extends from the main body portion 63 in the −Z direction. In addition, the second electrode material 62 is provided with a main body portion 65 that is bonded to the resistive material 10 and an extended portion 66 that is formed integrally with the main body portion 65 and that extends from the main body portion 65 in the −Z direction.

The main body portion 63 is provided with a protruded portion 631 that protrudes towards the resistive material 10 and that has an end surface with substantially the same shape as the first end surface of the resistive material 10 (on the +X direction side). In the main body portion 63, the protruded portion 631 is bonded with the end surface of the resistive material 10 on the +X direction side so as to be abutted thereto. In addition, the main body portion 65 is provided with a protruded portion 651 that protrudes towards the resistive material 10 and that has an end surface with substantially the same shape as the second end surface of the resistive material 10 (on the −X direction side). In the main body portion 65, the protruded portion 651 is bonded with the end surface of the resistive material 10 on the −X direction side so as to be abutted thereto.

Although not shown in FIG. 4, an outer circumferential surface of the resistor 3 is also formed with the stripe-patterned grooves and ridges that extend over the Y direction.

In the first modification, the length L0 of the resistive material 10 in the X direction is formed so as to be shorter than the length L1 of the first electrode material 61 and the length L2 of the second electrode material 62.

In addition, a length dr of the resistive material 10 in the Z direction, the length dr of the main body portion 63 of the first electrode material 61, and the length dr of the main body portion 65 of the second electrode material 62 in the resistor 3 are formed so as to be larger than the length dr of the resistive material 10, the length dr of the main body portion 31 of the first electrode material 21, and the length dr of the main body portion 41 of the second electrode material 22 in the Z direction of the resistor 2 of the second embodiment.

In addition, the length d1 of the extended portions 64 and 66 in the Z direction is formed so as to be smaller, in other words, shorter than the length dr of the resistive material 10, the main body portion 63, and the main body portion 65 of the resistor 3.

In addition, in the X direction, the length L11 of the main body portion 63 of the first electrode material 61 and a length L21 of the main body portion 65 of the second electrode material 62 are formed so as to be shorter than the length of each main body portion 31, 41 of the resistor 2 in the X direction.

By having such a configuration, even in a case in which the length L0 of the resistance body is made shorter compared with the case in the second embodiment, because the first electrode material 61, the resistive material 10, and the second electrode material 62 are stacked in this order, and because the bonded surfaces are formed by a parallel bonding, it is possible to ensure the distance between the electrodes. Therefore, it is possible to achieve the resistor 3 with the low resistance while ensuring the distance between the circuit board and the mounting surface of the resistive material 10. In addition, it is possible to improve a design flexibility of the circuit board on which the resistor 3 is to be mounted.

Second Modification

Figure 5:
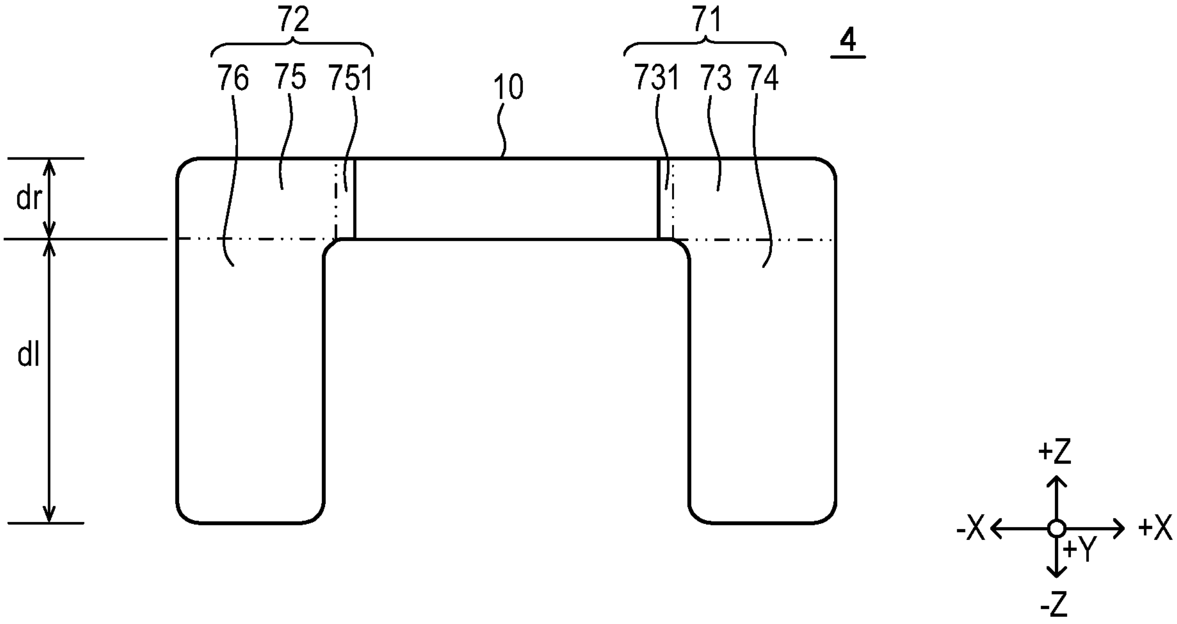
FIG. 5 is a side view for explaining the resistor according to a second modification of the present disclosure.

FIG. 5 is a side view for explaining a resistor 4 according to a second modification of the present embodiment. The resistor 4 is provided with a first electrode material 71 and the second electrode material 22 that are respectively bonded to the resistive material 10. The first electrode material 71 is provided with a main body portion 73 that is bonded to the resistive material 10 and an extended portion 74. In addition, a second electrode material 72 is provided with a main body portion 75 that is bonded to the resistive material 10 and an extended portion 76.

The main body portion 73 is provided with a protruded portion 731 that has an end surface with substantially the same shape as the first end surface of the resistive material 10 (the +X direction side). In the main body portion 73, the protruded portion 731 is bonded with the end surface of the resistive material 10 so as to be abutted thereto. In addition, the main body portion 75 is provided with a protruded portion 751 that has an end surface with substantially the same shape as the second end surface of the resistive material 10 (the −X direction side), and the protruded portion 751 is bonded with the end surface of the resistive material 10 so as to be abutted thereto.

Although not shown in FIG. 5, an outer circumferential surface of the resistor 4 is also formed with the stripe-patterned grooves and ridges that extend over the Y direction.

In the resistor 4, the length of the extended portions 74 and 76 in the Z direction d1 is formed so as to be larger than the length dr of the resistive material 10, the length dr of the main body portion 73 of the first electrode material 71, and the length dr of the main body portion of the second electrode material 72. With such a configuration, compared with the first modification, it is possible to achieve the resistor 4 with the low resistance while increasing the gap between the circuit board and the mounting surface of the resistive material 10. In addition, similarly to the first modification, it is possible to improve a design flexibility of the circuit board on which the resistor 4 is to be mounted. In this modification, it is possible to determine the length d1 of the extended portions 64 and 66 in the Z direction by considering a TCR property and a high frequency property of the resistor 4.

Third Modification

Figure 6:
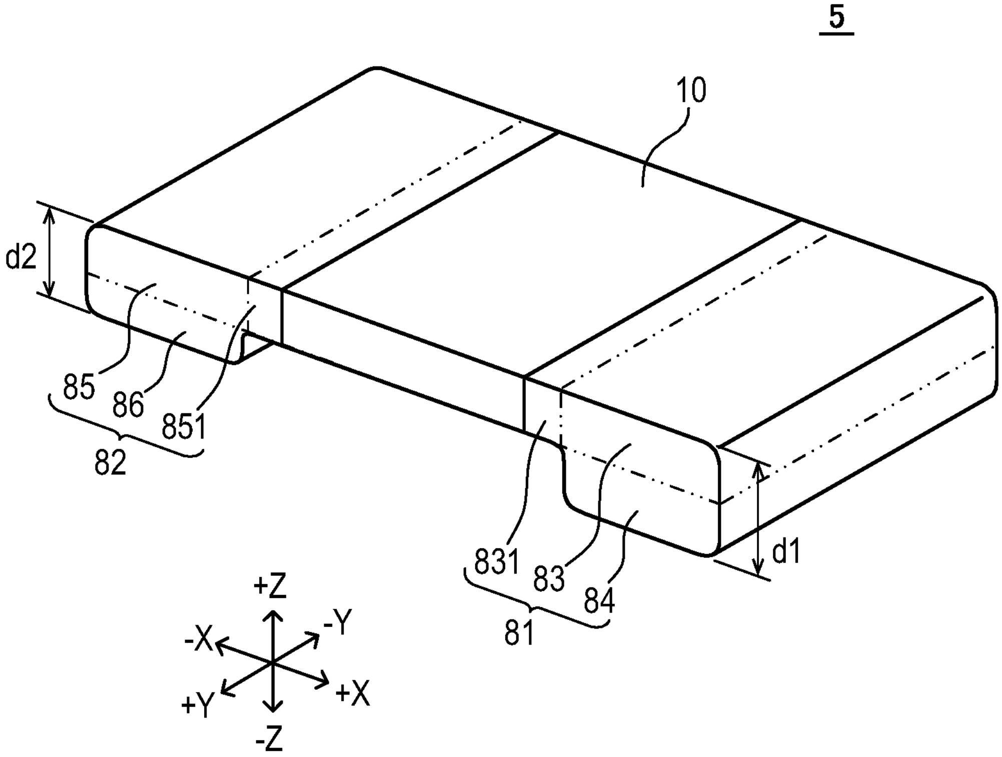
FIG. 6 is a perspective view for explaining the resistor according to a third modification of the present disclosure.
Figure 7:
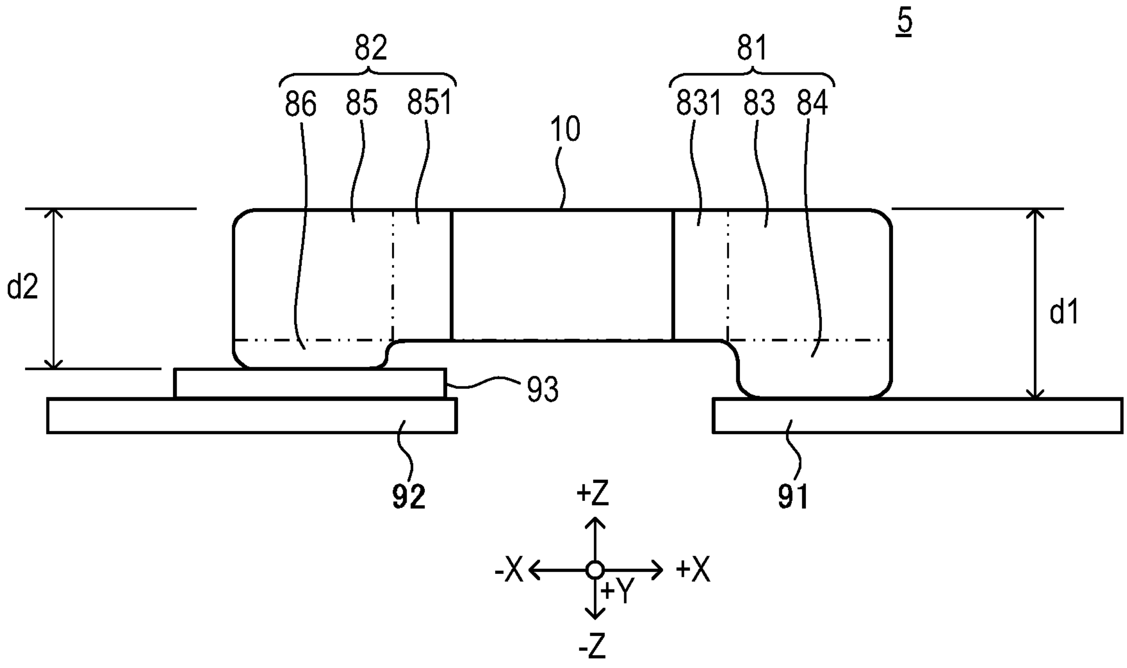
FIG. 7 is a sectional view for explaining a state in which the resistor according to the third modification is mounted on the circuit board.

FIG. 6 is a perspective view for explaining a resistor 5 according to a third modification of the present embodiment. In addition, FIG. 7 is a sectional view for explaining a state in which the resistor 5 is mounted on the circuit board.

The resistor 5 is provided with a first electrode material 81 and a second electrode material 82 that are respectively bonded to the resistive material 10. The first electrode material 81 is provided with a main body portion 83 that is bonded to the resistive material 10 and an extended portion 84. In addition, the second electrode material 82 is provided with a main body portion 85 that is bonded to the resistive material 10 and an extended portion 86.

The main body portion 83 is provided with a protruded portion 831 that is bonded to the resistive material 10. In addition, the main body portion 85 is provided with a protruded portion 851 that is bonded to the resistive material 10.

Although the stripe-patterned grooves and ridges are also formed on an outer circumferential surface of the resistor 5 so as to extend over the Y direction, for the sake of simplification of the description, illustration thereof is omitted in FIG. 6.

In the resistor 5 according to this modification, in the Z direction, the length d1 of the first electrode material 81 is larger than the length d2 of the second electrode material 82 (d1>d2).

According to this modification, as shown in FIG. 7, in a case in which another semiconductor 93 is to be mounted between a land pattern 91, 92 formed on the circuit board and the extended portion 86 of the resistor 5 on one side, it is possible to design the resistor 5 such that the length d1 of the first electrode material 81 is larger than the length d2 of the second electrode material 82 in the Z direction. Thus, it is possible to compensate the thickness of the semiconductor 93 that is interposed between the resistor 5 and the circuit board, and it is possible to allow the protruded amount of the resistor 5 from the circuit board to fall into a predetermined value. In the resistor 5, another semiconductor having a different thickness from the semiconductor 93 may be interposed between the extended portion 86 and the circuit board.

Explanation of Manufacturing Method of Resistor

Next, the manufacturing method of the resistors 1 to 5 according to the above-described embodiments will be described in detail with reference to FIG. 8. Because basic configurations of the manufacturing methods of the resistors 1 and 2 according to the above-described embodiments and the resistors 3, 4, and 5 according to the modifications are the same, the manufacturing method of the resistor 2 will be described below.

Figure 8:
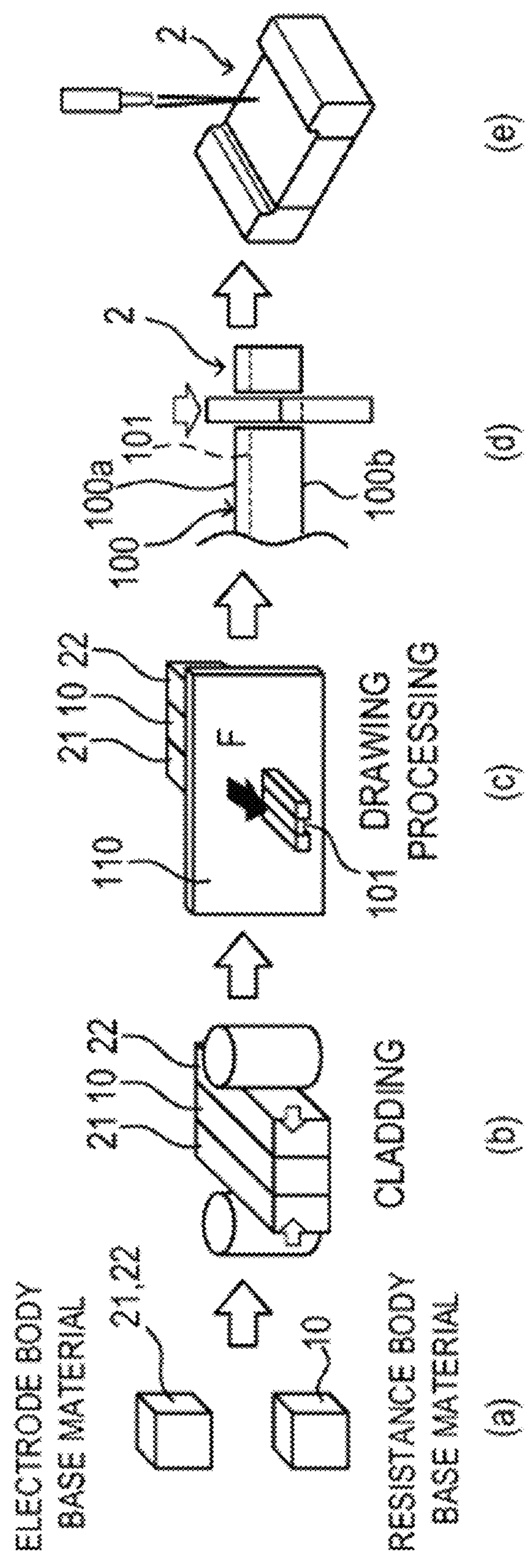
FIG. 8 is a schematic view for explaining a manufacturing method of the resistor according to the embodiment of the present disclosure.

FIG. 8 is a schematic view for explaining the manufacturing method of the resistor 2 according to the second embodiment.

The manufacturing method of the resistor 2 according to the second embodiment includes: Step (a) of preparing materials; Step (b) of bonding the materials; Step (c) of processing the shape; Step (d) of cutting out individual resistor; and Step (e) of adjusting the resistance value of the resistor by using a laser.

In Step (a) of preparing the materials, the resistive material 10 and the electrode materials 21 and 22 are prepared. The resistive material 10 and the electrode materials 21 and 22 are each a long wire rod having a flat rectangular shape. In the present embodiment, from the view point of the size, the resistance value, and a processability of the resistor, it is preferable to use a copper-manganese-nickel alloy and a copper-manganese-tin alloy as the material of the resistive material 10 and to use the oxygen-free copper (C1020) as the material of the electrode materials 21 and 22.

In Step (b) of bonding the materials, the first electrode material 21, the resistive material 10, and the second electrode material 22 are stacked in this order, and the materials are bonded by applying pressure in the stacked direction, and thereby, a resistor base material 100 is formed.

In other words, in Step (b), a so-called cladding between dissimilar metal materials is performed. The bonded surface between the first electrode material 21 and the resistive material 10 subjected to the cladding and the bonded surface between the second electrode material 22 and the resistive material 10 subjected to the cladding are each the diffusion bonded surface in which metal atoms from both materials are diffused to each other.

Thus, it is possible to perform firm mutual bonding at the bonded surface between the resistive material 10 and the first electrode material 21 and at the bonded surface between the resistive material 10 and the second electrode material 22, without performing the common electron beam welding. In addition, a good electrical property is obtained at the bonded surface between the resistive material 10 and the first electrode material 21 and at the bonded surface between the resistive material 10 and the second electrode material 22.

Figure 9A:
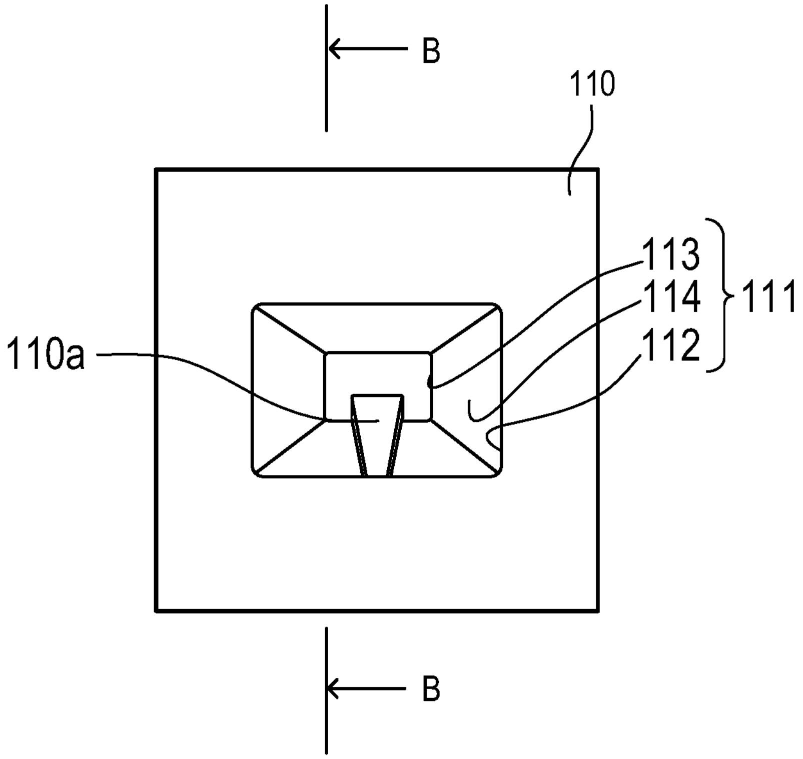
FIG. 9A is a front view of a die used in Step (c) shown in FIG. 8, viewed from the upstream side in the drawing direction F.
Figure 9B:
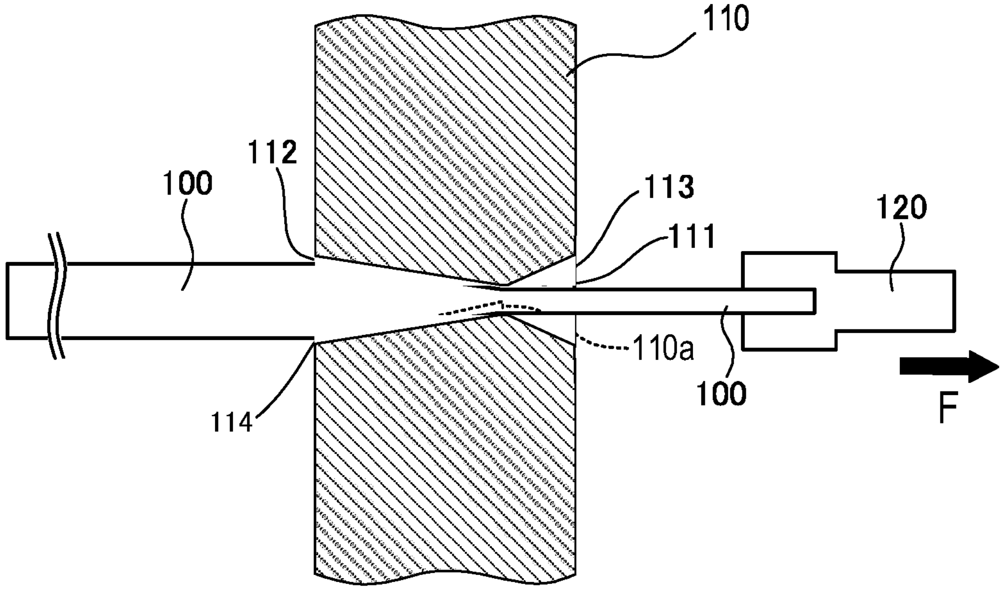
FIG. 9B is a schematic view for explaining a step of processing a shape in the manufacturing method of the resistor according to the present embodiment.

FIG. 9A is a front view of a die 110 used in Step (c) shown in FIG. 8 viewed from the upstream side in the drawing direction F. In addition, FIG. 9B is a schematic view for explaining Step (c) of processing the shape in the manufacturing method of the resistor 2. In FIG. 9B, the die 110 is shown in a sectional view taken along line B-B in FIG. 9A, and the resistor member 100 is shown in a side view.

In Step (c), the resistor base material 100 obtained by the cladding is passed through the die 110. When the resistor 2 is to be manufactured, as one example, it is possible to use the die 110 shown in FIG. 9A.

An opening portion 111 is formed in the die 110. The opening portion 111 has an inlet opening 112 that is set to have the dimension that allows the insertion of the resistor base material 100, an outlet opening 113 that is set to have the dimension smaller than the outer dimension of the resistor base material 100, and an insertion portion 114 that is formed to have a tapered shape from the inlet opening 112 towards the outlet opening 113. In the present embodiment, the opening portion 111 is formed to have a rectangular shape in which corner portions are processed to have the chamfered shapes.

In addition, the die 110 having a protruded shape 110*a*, which protrudes towards the center of the opening on a part of any sides of the opening portion 111, is applied.

By passing the resistor base material 100 through the die 110 having such a shape, it is possible to compressively deform the resistor base material 100 from all directions, and a groove 101 that continuously extends in the drawing direction F is formed in the resistor base material 100 by the protruded shape 110*a*.

In addition, in the present embodiment, in Step (c), when the resistor base material 100 is passed through the die 110, a drawing method in which the resistor base material 100 is drawn out by a holding tool 120 is applied. At this time, the stripe-patterned grooves and ridges are formed on the surfaces of the resistor base material 100 as sliding marks.

In Step (c), instead of employing the drawing processing in which the forming is completed by performing the drawing once, it may be possible to employ the drawing processing in which a plurality of dies respectively having the opening portions 111 with different sizes are prepared and the resistor base material 100 is passed through the plurality of dies in a consecutive manner.

In addition, in Step (c), by changing the shape of the opening portion 111 of the die 110, it is possible to manufacture, for example, the resistor 1 without the extended portion, the resistors 3, 4, and 5 respectively shown as the modifications, and so forth.

When the resistor 2 is to be manufactured, as one example, the die 110, which has the shape protruding towards the center of the opening on a part of one side of the opening portion 111, is applied. In the resistor base material 100, the groove 101 that continuously extends in the drawing direction F is formed by the protruded shape 110*a* that is provided in the die 110.

As the resistor base material 100 is cut into separate pieces, the groove 101 forms a recessed portion that is surrounded by the resistive material 10, the main body portion 31 and the extended portion 32 of the first electrode material 21, and the main body portion 41 and the extended portion 42 of the second electrode material 22.

In Step (d) following Step (c), the resistor is cut out from the resistor base material 100 so as to achieve the size W in the width direction as designed. In addition, in the present embodiment, in Step (d), it is preferred that, the resistor base material 100 be cut from a surface 100*a* of the resistor base material 100, in which the groove 101 is formed, towards an opposite surface 100*b*.

Finally, in Step (e), the resistance value is adjusted as necessary by forming a cut out portion in a predetermined portion of the resistive material 10 of the resistor 2 by using the laser.

By following Steps (a) to (e) as described above, it is possible to obtain an individual piece of the resistor 1 from the resistor base material 100.

Actions and Effects

Next, actions and effects in the present embodiment will be described.

With the manufacturing method according to the present embodiment, the first electrode material 21, the resistive material 10, and the second electrode material 22 are integrated by performing the cladding by stacking them and applying the pressure. By doing so, for example, it is possible to increase a bonding strength between the resistive material 10 and the respective electrode materials 21 and 22 without using the electron beam welding.

In addition, according to the manufacturing method according to the present embodiment, by compressing the resistor base material 100 from all directions by passing it through the die 110, it is possible to form the external shape of the resistor base material 100 while ensuring the dimensional accuracy. Therefore, after the resistor base material 100 is formed, it is possible to manufacture the individual resistor 2 only by performing Step (d) shown in FIG. 8.

Therefore, it is possible to suppress individual differences caused when the resistor is manufactured by performing a plurality of processing steps. In addition, in the present embodiment, by passing the resistor base material 100, which has been subjected to the cladding, through the die 110 to compress it from all directions, it is possible to further increase the bonding strength between the resistive material 10 and the respective electrode materials 11 and 12.

As a method to compress the resistor base material from all directions, if the resistor base material is of a square shape, for example, there has been a method in which the resistor base material is subjected to a first pressure welding by using a pair of rollers that apply the pressure in the thickness direction Z, and thereafter, the resistor base material is subjected to a second pressure welding by using a pair of rollers that apply the pressure in the width direction (the Y direction).

However, with such a method, in the first pressure welding step, although the resistor base material is compressed in the thickness direction Z, the resistor base material is expanded in the width direction Y. In addition, in the following second pressure welding step, although the resistor base material is compressed in the width direction Y, the resistor base material is expanded in the thickness direction Z. As manufacturing errors are accumulated as described above, the dimensional accuracy is deteriorated, and individual variation for the resistor, variation in a temperature distribution when power is applied to the resistor, and so forth are increased.

In contrast, according to the manufacturing method in the present embodiment, by performing the drawing step in which the resistor base material 100 is passed through the die 110, it is possible to uniformly compress the resistor base material 100 in the length-wise direction X and in the thickness direction Z.

Therefore, compared with a resistor base material obtained by repeating the compression from one direction and the compression from the other direction by using the rollers, it is considered that an electrically advantageous bonding interface is formed in the resistor base material 100. Therefore, it is possible to ensure a reliability of the properties for the resistor 2 as an end product.

With the manufacturing method according to the present embodiment, especially, by using the plurality of dies 110 respectively having the opening portions 111 of different types in a consecutive manner, a compression forming is performed such that the size of the resistor base material 100 is reduced in a consecutive manner. Thereby, it is possible to uniformly compress the resistor base material 100 in the length direction X and in the thickness direction Z while reducing the load to the resistor base material 100 and the die 110. Thus, it is possible to suppress differences in properties for the resistor 2 as the end product.

In addition, according to the manufacturing method according to the present embodiment, in Step (c) in which the resistor base material 100 is passed through the die 110, by applying the drawing step, it is possible to increase the accuracy of the end product compared with an extruding method. By using this manufacturing method, it is possible to achieve a stabilization of the properties as the resistor 1.

Especially, at least the outlet opening 113 of the opening portion 111 of the die 110 is formed with continuous curves. With such a configuration, it is possible to relieve a stress imparted while the resistor base material 100 is being passed through the opening, and so, it is possible to reduce the load to the resistor base material 100 and the die 110. Thus, it is possible to suppress differences in properties for the resistor 1 as the end product.

In addition, because at least the outlet opening 113 is formed with the continuous curves, the corner portion of the resistor 1, which is obtained by being passed through the die 110, is rounded. Thus, it is possible to suppress the electromigration caused in the resistor 1 at the edge side portion P. In addition, it is possible to increase the heat cycle resistance of the resistor 1.

In addition, according to the manufacturing method according to the present embodiment, because the first electrode material 21, the resistive material 10, and the second electrode material 22 are bonded with each other by the diffusion bonding, the welding beads are not formed. With the conventional bonding performed by the welding, as the size of the resistor is reduced, the non-negligible influence may be imparted to the resistance value by the welding beads. However, there is no such a concern for the resistors 1 to 5 obtained by the manufacturing method according to the present embodiment.

As described above, in the manufacturing method according to the present embodiment, the resistor base material 100 is obtained by cladding the resistive material 10 and the respective electrode materials 21 and 22, and the resistor base material 100 is passed through the die 110 to perform the forming, and therefore, for example, it is possible to increase the bonding strength between the materials without using the electron beam welding, and it is possible to ensure a high dimensional accuracy. Thus, the manufacturing method is suitable for the manufacture of the resistors 1 to 5 having the small size.

When the resistor 2 is to be manufactured, in Step (d) shown in FIG. 8, it is preferred that the resistor base material 100 be cut from the surface 100*a* of the resistor base material 100, in which the groove 101 is formed, towards the opposite surface 100*b*. By doing so, it is possible to cause the burr formed during the cutting to be received in a space within a groove (a recessed portion) on the mounting surface side.

In addition, in the manufacturing method according to the present embodiment, before performing Step (c) of processing the shape, a step of adjusting the size of the resistor base material 100, which has been subjected to the cladding, to the size that allows the insertion thereof into the die 110 may be performed.

Figure 10:
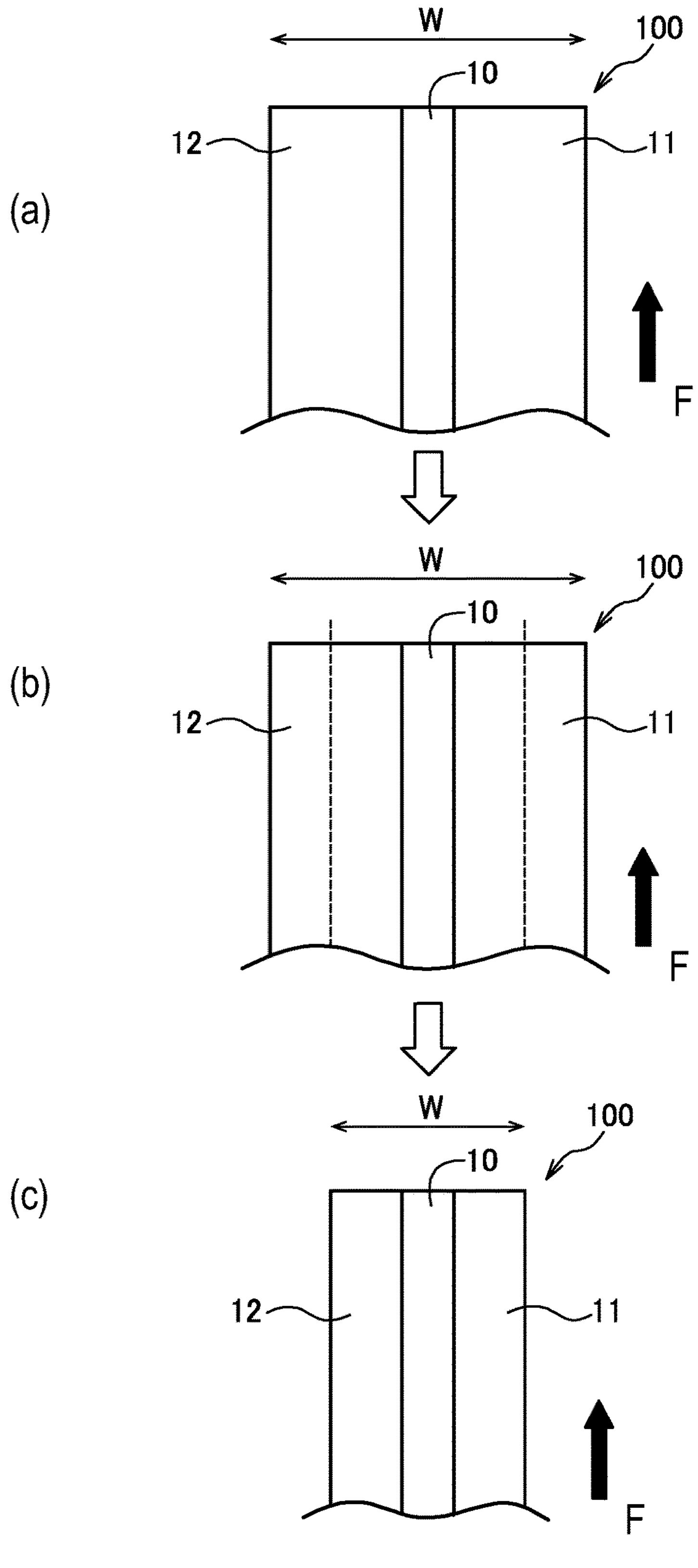
FIG. 10 is a schematic view for explaining a step of adjusting size of a resistor base material to the size that allows insertion into the die in the manufacturing method of the resistor according to the present embodiment.

FIG. 10 is a schematic view for explaining the step of adjusting the size of the resistor base material 100 that is performed prior to Step (c).

In this step, as one example, as shown in FIG. 10 (*a*), in order to make the resistor base material 100, which has obtained through Step (b) of bonding the materials, insertable into the inlet opening 112 of the die 110, both end portions of the resistor base material 100 at the direction orthogonal to the drawing direction F, in other words, portions outside dotted lines shown in FIG. 10 (*b*) are cut off along the drawing direction F.

Next, as shown in FIG. 10 (*c*), the resistor base material 100 is inserted to the die 110 after being processed to the size that is adapted to the inlet opening 112 of the die 110.

As described above, by adding the step of adjusting the size of the resistor base material 100 before Step (c) of processing the shape, it is possible to prevent deviation of compressive stress applied to the resistor base material 100 that is caused when the resistor base material 100 is passed through the die 110. In addition, thus, it is possible to suppress differences in properties for the resistor 1 as the end product.

Other Embodiments

The embodiments of the present disclosure as described above merely illustrate a part of application examples of the present disclosure, and the technical scope of the present disclosure is not intended to be limited to the specific configurations of the above-described embodiments.

For example, in FIG. 2, the end surfaces of the resistor 2 in the Y direction (the end surfaces of the electrode materials 21 and 22 in the Y direction) and the respective bonded surfaces between the resistive material 10 and the respective electrode materials 21 and 22 are shown so as to substantially orthogonally intersect with each other in the drawings. In addition, the side surface of the resistor 2 along the Y direction (the opposite surface 22*a* relative to the bonded surface between the resistive material 10 and the electrode material 21, 22) and the respective bonded surfaces between the resistive material 10 and the electrode materials 21 and 22 are shown so as to be parallel with each other. However, the relationships between the respective surfaces are not limited thereto.

In addition, the bonded surfaces between the resistive material 10 and the respective electrode materials 11 and 22 are shown with straight lines in FIGS. 2 and 3. However, because the bonded surfaces between the resistive material 10 and the respective electrode materials 11 and 22 are the diffusion bonded surfaces, in a microscopic scale, the resistive material 10 is not in close contact with each of the electrode materials 11, 11, 12 at a flat end surface.

In addition, in FIG. 2, the area of the resistive material 10 on the mounting surface 51 side may be larger than the area of the opposite surface 52 on the opposite side relative to the mounting surface 51. In addition, Conversely, the area of the resistive material 10 on the mounting surface 51 side may be smaller than the area of the opposite surface 52 on the opposite side relative to the mounting surface 51. In the side surface of the resistor 2 (in other words, a cross-section of the resistor base material 100), the bonded surfaces between the resistive material 10 and the respective electrode materials 21 and 22 may vary depending on the cross-sectional shape of the electrode material or the resistance body material prior to the cladding.

In the present embodiment, as the material of the resistive material 10 that is applied to the resistors 1 to 5, a resistive material with high resistance may be used. By doing so, it is possible to reduce the size of the resistor while ensuring the resistance value of the resistor.

The present application claims a priority based on Japanese Patent Application No. 2020-011192 filed on Jan. 27, 2020 in the Japan Patent Office, the entire contents of which are incorporated herein by reference.

The invention claimed is:

1. A manufacturing method of a resistor comprising:

a step of forming a resistor base material by stacking an electrode material, a resistive material, and an electrode material in this order and by bonding the electrode material, the resistive material, and the electrode material by applying pressure in a stacked direction;

a step of passing the resistor base material through a die by using a drawing method, the die being formed with an opening portion having a dimension smaller than an outer dimension of the resistor base material; and a step of obtaining an individual resistor from the resistor base material passed through the die, wherein the opening portion has a rectangular shape, a part of one side of the rectangular shape of the opening portion has protuding shape towards a center of opening, the protruding shape makes a groove in the resistor base material, and the resistor base material is out from a one surface side of the resistor base material in which the groove is formed towards an opposite face side of the one surface.

2. The manufacturing method of the resistor according to claim 1, wherein the resistor base material is passed through other die, the other die being formed with an opening portion having a dimension smaller than the opening portion.

3. The manufacturing method of the resistor according to claim 1, wherein the resistor base material is passed through the die by using a drawing method.

4. A resistor mounted on a circuit board, the resistor comprising:

a resistive material having a square shape;

a first electrode material bonded to a first end surface of the resistive material; and a second electrode material bonded to a second end surface of the resistive material, wherein a surface of the resistor is formed with stripe-patterned grooves and ridges extending in a direction orthogonal to a bonding direction in which the first electrode material, the resistive material, and the second electrode material are arranged side by side, and a mounting surface for the circuit board, an opposite surface relative to the mounting surface, an opposite surface relative to a surface of the first electrode material bonded to the resistive material, and an opposite surface relative to a surface of the second electrode material bonded to the resistive material respectively stripe-patterned grooves and ridges, the strip-patterned grooves and ridges extending in the direction orthogonal to the bonding direction.

5. The resistor according to claim 4, wherein a length of the resistor in the bonding direction is equal to or shorter than 3.2 mm, and a resistance value of the resistor is equal to or lower than 2 mΩ.

* * * * *